June 1, 1965  A. F. BOLT  3,186,017
SAFETY DEVICE FOR VEHICLES
Filed June 25, 1963  2 Sheets-Sheet 1

INVENTOR.
ARTIE F. BOLT,
BY
ATTORNEYS.

June 1, 1965   A. F. BOLT   3,186,017
SAFETY DEVICE FOR VEHICLES
Filed June 25, 1963   2 Sheets-Sheet 2
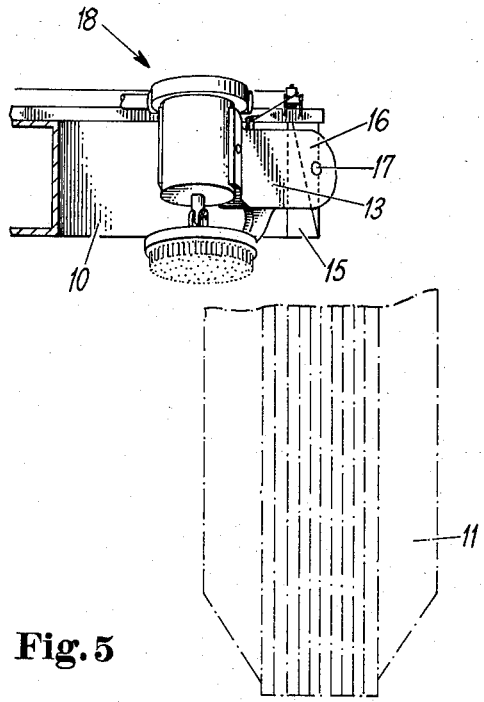
Fig. 5
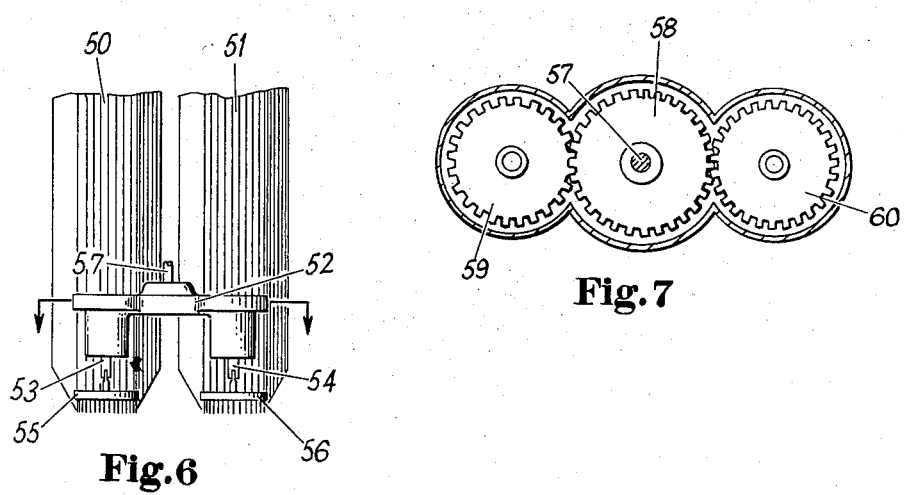
Fig. 6
Fig. 7
INVENTOR.
ARTIE F. BOLT,
ATTORNEYS.

United States Patent Office 3,186,017
Patented June 1, 1965

3,186,017
SAFETY DEVICE FOR VEHICLES
Artie F. Bolt, 3327 Greenbush Ave., Groesbeck, Cincinnati 36, Ohio
Filed June 25, 1963, Ser. No. 290,433
11 Claims. (Cl. 15—87)

This invention relates to a safety device for motor vehicles, and more particularly to an apparatus which may be used on cars, trucks, and the like to give traction and prevent skidding under icy or snowy road conditions.

Motor vehicle safety has become an increasingly important problem as the number of motor vehicles on the road increased so rapidly over the last decade or so. Under winter driving conditions, the problem of loss of traction and consequent skidding presents unusually difficult problems.

Winter driving conditions, in addition to the pure safety problem, often present a problem of inconvenience. That is, getting stuck in snow or ice at the side of the road, or not being able to get one's car out of the driveway, while generally not dangerous to life and limb, is certainly a nuisance.

It is therefore a primary object of this invention to provide a device which may be used in conjunction with conventional motor vehicles to provide traction for the driving wheels under icy or snowy road conditions.

Another object of this invention is the provision of a device which will effectively prevent skidding of cars, trucks and the like due to ice or snow.

Still another object of this invention is the provision of such a device which in accomplishing the above objectives, will not harm the road surface.

A further object of the instant invention is the provision of such a device which includes means for partially retracting itself to avoid obstructions in the road surface which might damage the device.

Still a further object of the invention is to provide such an apparatus which may be carried in a retracted, inoperative position, so as not to present an unsightly appearance.

These objects and advantages, along with others which will become apparent to the skilled worker in the art as this specification proceeds, may be accomplished by the exemplary embodiment shown in the accompanying drawings. In the drawings:

FIGURE 5 is a rear elevational view of the apparatus of this invention in the retracted position;

FIGURE 6 is a front elevational view of a modified portion of the device of this invention; and FIGURE 7 is a cross sectioinal view along line 7—7 of FIGURE 6.

Briefly, the practice of this invention contemplates the provision of a rotatable brush-like member pivotally mounted on the frame of a motor vehicle, and movable from a retracted, inoperative position, to an extended, operative position directly in front of the driving wheel of the vehicle. When icy or snowy road condtiions are encountered, the operator of the vehicle, upon actuation of a single switch will simultaneously move the brush-like member to its operative position, and start the motor which drives the brush-like member. This device will serve to clean ice, snow, and the like from the path of the driving wheels of the vehicle, so that safe traction may be maintained.

Figure 1:
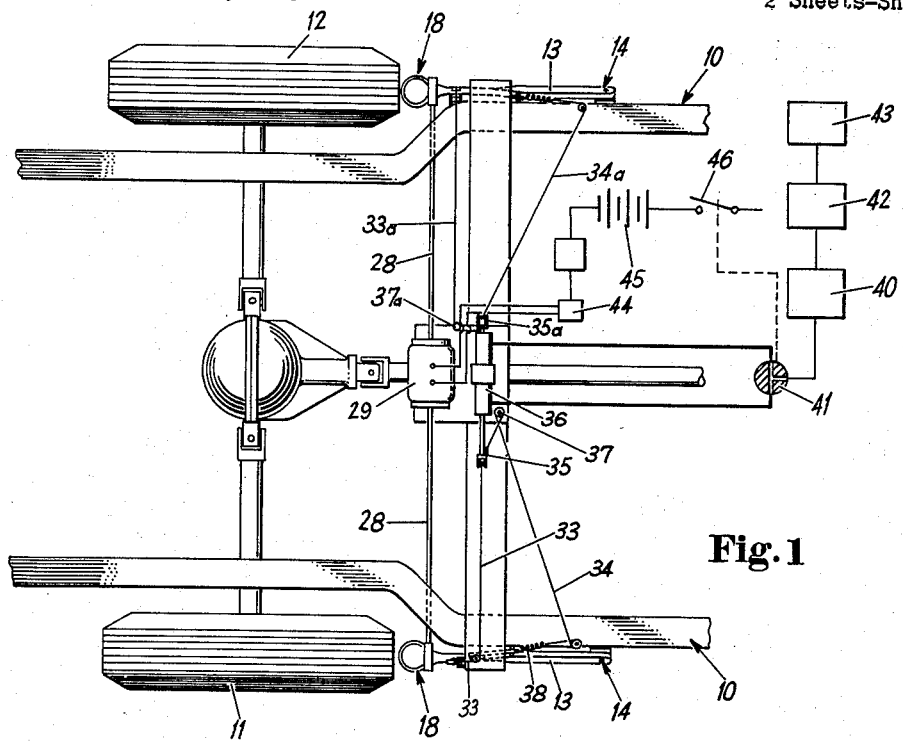
FIGURE 1 is a top plan view of the apparatus of this invention, with certain elements shown schematically.

The device of this invention is adapted to be mounted on a motor vehicle having a frame such as indicated generally in FIGURE 1 at 10, and driving wheels 11 and 12.

The device itself of this invention includes the mounting bracket or arm 13 which is pivotally mounted to the frame as at 14. As shown in FIGURES 1 and 5, the pivotal mounting is arranged so that the axis about which the bracket 13 rotates is angularly disposed with respect to the horizontal. As shown in FIGURE 5, this may be accomplished by means of a bearing block 15 which is secured to the frame 10 of a vehicle by any suitable means. The block 15 is provided with a bearing surface 16 sloping outwardly and to the rear. The bracket arm 13 may be pivoted about the pin 17, in a plane defined by the bearing surface 16. That is, the bracket is movable from the retracted, inoperable position shown in FIGURE 5, wherein the free end of the bracket is disposed inside the path of the driving wheels of the vehicle, to the extended, operative position shown in FIGURES 1 and 2, wherein the free end of the bracket arm 13 is disposed directly in front of the driving wheels.

Figure 3:
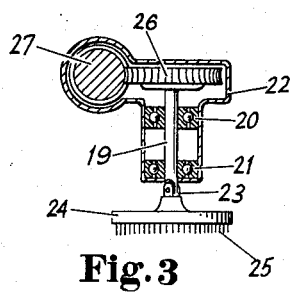
FIGURE 3 is a cross sectional view of a portion of the apparatus shown in FIGURE 2.
Figure 4:
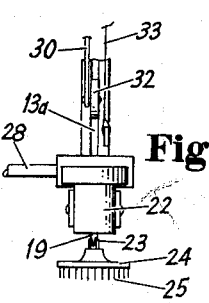
FIGURE 4 is a rear elevational view of a portion of the apparatus of this invention in the extended position.

At the free end of the bracket arm 13 is the brush-like member and assembly indicated generally at 18. As seen in detail in FIGURES 3 and 4, this assembly includes a shaft 19 journaled in suitable bearings 20 and 21 within a housing 22. Mounted on the lower end of the shaft 19 by means of the universal joint 23 is the disc 24. The disc 24 is preferably of a flexible material such as rubber or the like, and by virtue of its flexibility and the universal joint 23, will satisfactorily conform to the surface in front of the driving wheels. The face of the disc 24 is provided with a plurality of downwardly extending blades 25. In the preferred embodiment of this invention, these blades 25 will be a plurality of stiff wire bristles, preferably made of stainless steel to withstand exposure to ice, snow and salt.

At the upper end of the shaft 19 is the worm wheel 26, which is in meshing engagement with the worm 27. The worm 27 is connected by means of a suitable flexible coupling 28 to the drive shaft of a motor 29. As shown in the drawings, the motor 29 is mounted to the frame of the vehicle between the driving wheels, so that a single motor having a double ended drive shaft can adequately serve to drive the assemblies 18 in front of the driving wheels 11 and 12 respectively.

The purpose of the gear reduction drive just described is obviously to reduce the speed of the rotating disc 24. It is believed that a disc speed on the order of 1200 r.p.m. is entirely satisfactory, but that a higher speed would tend to throw pebbles and the like from the path of the vehicle with sufficient force to damage adjacent vehicles or pedestrians. Therefore, if the motor 29 is of a type that operates at a speed in this range, the gear reduction 26–27 is not necessary.

The raising and lowering of the bracket arm 13 and the assembly 18 may be accomplished in the following manner. An actuating arm 30 is pivotally mounted to the frame 10 as at 31. The outer end of the arm 30 carried the roller wheel 32, which is adapted to ride in a mating groove 13a (see FIGURE 4) in the upper surface of the bracket arm 13. The cables 33 and 34, connected respectively to the bracket arm 13 and the actuating arm 31 are connected at their opposite ends to the piston 35 of the fluid cylinder 36. (See FIGURE 1.) The connection between the piston 35 and the bracket arm 13 is essentially direct, so that as the piston 35 is retracted, the cable 33 will serve to draw the bracket arm 13 to its inoperative, retracted position. The cable 34 on the other hand, passes over the direction reversing means 37, so that as the piston is extended, it will pull the actuating arm 30 which in turn, through the roller 32 urges the bracket arm 13 and assembly 18 to the extended, operative position.

Figure 2:
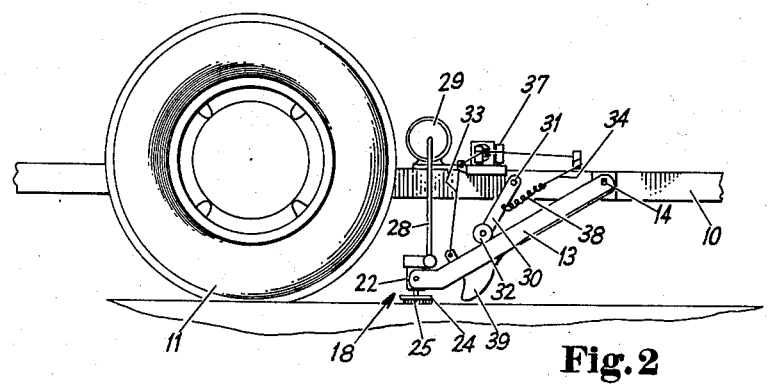
FIGURE 2 is a side elevational view of the device of this invention as secured to the frame of an automobile.

As most clearly seen in FIGURE 2, the preferred form of the invention includes a tension spring 38 between the cable 34 and the actuating arm 30. By virtue of this arrangement, the bracket arm 13 is normally urged to its extended position, but is free, upon overcoming the resistance of the spring 38, to partially retract to avoid obstructions in the roadway surface. To this end, the bracket arm 13 is provided with a guard member 39 extending downwardly from the bracket arm 13. The guard member is so arranged that its bottom is substantially on a level with the bottom of the disc 24. That is, an obstruction of insufficient height to contact the disc 24 would not cause a partial retraction of the entire assembly, because the stiff wire blades can easily avoid such an item. However, when a relatively large obstruction contacts the guard member 39, the entire bracket arm 13 and assembly 18 will be partially urged to the retracted position, to prevent damage to the device.

As noted before, an assembly 18 will be provided in front of each of the driving wheels of a vehicle. Rather than provide a second cylinder 36 for raising and lowering each bracket arm and assembly, it has been found satisfactory to provide the single cylinder 36 with a double ended piston shaft 35 and 35a. It will of course be apparent that with such an arrangement, for the opposite assembly 18, cables 33 and 34 must be reversed. That is, it is now the cable 34a which is secured directly to the actuating arm 31, while the cable 33a passes around the direction reversing means 37a and is then secured to the bracket arm 13. By virtue of such connection, movement of the single piston will simultaneously raise or lower both bracket arms 13 and the related assemblies 18.

FIGURE 1 also shows schematically an exemplary embodiment of an arrangement for controlling the device heretofore described. The fluid cylinder 36 is actuated by air from the pressure tank 40, and controlled by the two way valve 41. In the preferred form of the invention, the pressure tank 40 is supplied with air from a vacuum pump 42, which is operated by an air line connected to the carburetor 43 as is conventional in the art.

The motor 29 for driving the discs 24 is connected through the cutout relay 44 to the battery 45 of the vehicle, and is actuated by the switch 46. The switch 46 may be an ordinary solenoid switch, and as shown by the dotted line, serves to both energize the motor 29 and to control the valve 41, whereby the bracket arm 13 and assembly 18 will be lowered and the disc 24 caused to rotate simultaneously.

FIGURES 6 and 7 show a slight modification of the invention adapted for use on trucks or other vehicles wherein pairs of driving wheels such as 50 and 51 are employed. It will of course be understood that the bracket arm, the actuating arm, and the other components described above will be susbtantially the same. In this embodiment, a housing 52 is designed to accommodate a pair of shafts 53 and 54. These shafts respectively mount the rotatable discs 55 and 56. As seen in cross section in FIGURE 7, the upper portion of the housing accommodates a driving shaft 57 mounting a gear 58. This gear 58 is in meshing engagement with the gears 59 and 60, which respectively are mounted about the driven shafts 53 and 54. In this modification, it is to be preferred that a direct line from a motor (not shown) to the shaft 57 be utilized, and that separate motors be used on each side of the vehicle.

Numerous modifications in this invention will be apparent to the skilled worker in the art. While the description has been in terms of an exemplary embodiment, no limitation is intended thereby.

What is claimed as new and what it is desired to secure by Letters Patents is:

1. A safety device, for vehicles having driving wheels, comprising means for clearing a path directly in front of said driving wheels; means for mounting said path clearing means for pivotal movement about an axis angularly disposed with respect to the horizontal, whereby said path clearing means is movable from a retracted inoperative position disposed inside said path to be cleared, to an extended, operative position directly in front of said driving wheels; and means for raising and lowering said clearing means; said first named means comprising a mounting bracket, a shaft journaled for rotational movement about a vertical axis in said bracket, a disc secured to one end of said shaft and carrying a plurality of blades; said last named means including a fluid cylinder having a piston, a pair of cables effective to transmit motion of said piston to said bracket, one of said cables arranged to extend said bracket as said piston moves in one direction, and the other of said cables being arranged to retract said bracket as said piston moves in the opposite direction.

2. The device claimed in claim 1 including spring means between one of said cables and said bracket, whereby said bracket is normally urged to its extended position, but is free to partially retract to avoid obstructions in said path being cleared.

3. The device claimed in claim 2 including a guard member, extending angularly downwardly from said bracket in front of said disc, the bottom of said guard member being on a level with the bottom of said disc.

4. In a vehicle having at least one driving wheel, a safety device comprising a bracket arm mounted on the underside of said vehicle; means mounting said bracket arm for pivotal movement about an axis angularly disposed with respect to the horizontal, whereby said bracket arm is movable from a retracted position inside the path of said driving wheel to an extended position in the path of said driving wheel; an actuating arm pivotally secured to the underside of said vehicle, the opposite end of said actuating arm being in sliding engagement with said bracket arm; a shaft; means mounting said shaft for rotational movement, said mounting means being carried by the free end of said bracket arm; a disc mounted on the lower end of said shaft; a plurality of downwardly extending blades secured to said disc; means for driving said shaft; a fluid cylinder having a piston; a first cable, extending directly from said piston to said bracket arm; direction reversing means; a second cable, extending between said piston and said actuating arm through said direction reversing means; whereby movement of said piston in one direction is operative through one of said cables to extend said bracket arm, and movement of said piston in the opposite direction is operative to retract said bracket arm.

5. The device claimed in claim 4 including spring means between said second cable and said actuating arm, whereby said bracket arm is normally urged to its extended position, but is free to partially retract to avoid obstructions in said path being cleared.

6. The device claimed in claim 5 including a guard member, extending angularly downward from said bracket in front of said disc, the bottom of the guard member being on a level with the bottom of said disc.

7. The device claimed in claim 6 wherein said downwardly extending blades comprise a multiplicity of stainless steel wires.

8. The device claimed in claim 7 wherein said means mounting said shaft for rotational movement includes a gear reduction unit.

9. In a vehicle having driving wheels, a safety device comprising a bracket arm mounted on the underside of said vehicle; means mounting said bracket arm for pivotal movement about an axis angularly disposed with respect to the horizontal whereby said bracket arm is movable from a retracted position inside the path of said driving wheels to an extended position in the path of said driving wheels; means for raising and lowering said bracket arm; a gear box having a driving shaft and a pair of downwardly extending spaced apart driven shafts mounted on the free end of said bracket arm; a disc mounted on the end of each of said driven shafts; a plurality of downwardly extending blades secured to said discs; and means for rotating said driving shafts.

10. A safety device for vehicles having at least one driving wheel, comprising a mounting bracket, a shaft journaled for rotational movement in said bracket, a disc mounted on one end of said shaft, a plurality of downwardly extending blades secured to the face of said disc, means for mounting said bracket for pivotal movement about an axis angularly disposed with respect to the horizontal, and means for raising and lowering said bracket, whereby said bracket is movable from a retracted position inside the path of said driving wheel to an operative position in the path of said driving wheel.

11. A safety device for vehicles having at least one driving wheel, comprising means for clearing a path directly in front of said driving wheels; means for mounting said path clearing means for pivotal movement about an axis angularly disposed with respect to the horizontal, and means for raising and lowering said path clearing means; said path clearing means comprising a mounting bracket, a shaft journaled for rotational movement in said bracket, a disc secured to one end of said shaft, and a plurality of downwardly extending blades secured to the face of said disc; said means for raising and lowering said path clearing means including a fluid cylinder and connecting means between said cylinder and said bracket arranged to extend and retract said bracket.

References Cited by the Examiner

UNITED STATES PATENTS

| | | | |
|---|---|---|---|
| 287,411 | 10/83 | Birnbaum et al. | 15—55 X |
| 2,870,469 | 1/59 | Meece | 15—55 X |
| 2,895,151 | 7/59 | Link | 15—87 |
| 2,987,741 | 6/61 | Feldman | 15—87 X |
| 2,996,742 | 8/61 | Aimers et al. | 15—87 |

FOREIGN PATENTS

| | | |
|---|---|---|
| 434,407 | 9/26 | Germany. |
| 546,123 | 6/42 | Great Britain. |

CHARLES A. WILLMUTH, *Primary Examiner.*